United States Patent
Zhu et al.

(10) Patent No.: US 9,764,951 B2
(45) Date of Patent: Sep. 19, 2017

(54) MAGNESIUM-BASED HYDROGEN STORAGE MATERIAL AND METHOD FOR PREPARING THE SAME

(71) Applicant: SOUTH CHINA UNIVERSITY OF TECHNOLOGY, Guangzhou, Guangdong Province (CN)

(72) Inventors: Min Zhu, Guangzhou (CN); Huaijun Lin, Guangzhou (CN); Liuzhang Ouyang, Guangzhou (CN); Hui Wang, Guangzhou (CN); Jiangwen Liu, Guangzhou (CN); Weihua Wang, Guangzhou (CN); Deqian Zhao, Guangzhou (CN)

(73) Assignee: SOUTH CHINA UNIVERSITY OF TECHNOLOGY, Guangzhou, Guangdong Province (CN)

( * ) Notice: Subject to any disclaimer, the term of this patent is extended or adjusted under 35 U.S.C. 154(b) by 60 days.

(21) Appl. No.: 14/917,142

(22) PCT Filed: Dec. 20, 2013

(86) PCT No.: PCT/CN2013/090060
§ 371 (c)(1),
(2) Date: Mar. 7, 2016

(87) PCT Pub. No.: WO2015/032158
PCT Pub. Date: Mar. 12, 2015

(65) Prior Publication Data
US 2016/0194201 A1    Jul. 7, 2016

(30) Foreign Application Priority Data
Sep. 5, 2013 (CN) .......................... 2013 1 0400671

(51) Int. Cl.
*C01B 3/00* (2006.01)
*B22F 9/04* (2006.01)
(Continued)

(52) U.S. Cl.
CPC ............ *C01B 3/0057* (2013.01); *B22F 9/008* (2013.01); *B22F 9/04* (2013.01); *C01B 3/0031* (2013.01);
(Continued)

(58) Field of Classification Search
None
See application file for complete search history.

(56) References Cited

U.S. PATENT DOCUMENTS 4,200,624 A * 4/1980 Muller .................. C01B 3/0026
34/416
5,304,260 A * 4/1994 Aikawa ................. C22C 45/005
148/403

(Continued)

FOREIGN PATENT DOCUMENTS

CN    1397658 A    2/2003
CN    102286684 A    12/2011
JP    H11-269572 A    10/1999

OTHER PUBLICATIONS

Lin, H.J. et al., "Hydrogen storage properties of Mg—Ce—Ni nanocomposite induced from amorphous precursor with the highest Mg content," International Journal of Hydrogen Energy, vol. 37, (2012), pp. 14329-14335.

(Continued)

*Primary Examiner* — Joseph D Anthony
(74) *Attorney, Agent, or Firm* — Oliff PLC

(57) ABSTRACT

A method for preparing a magnesium-based hydrogen storage material, includes: a Mg—Ce—Ni family amorphous alloy is prepared by a rapid cooling process; the amorphous (Continued)

alloy is pulverized, so as to obtain a amorphous powder; the amorphous alloy is activated, so as to obtain a $MgH_2$—$Mg_2NiH_4$—$CeH_{2.73}$ family nanocrystalline composite; the abovementioned composite is carried out a hydrogen absorption and desorption cycle, then the composite is placed in a pure Ar atmosphere for passivation, finally, the passivated composite is oxidized, so as to obtain a $MgH_2$—$Mg_2NiH_4$—$CeH_{2.73}$—$CeO_2$ family nanocrystalline composite.

10 Claims, 5 Drawing Sheets

(51) Int. Cl.
  B22F 9/00 (2006.01)
  C22C 1/00 (2006.01)
  C22C 45/00 (2006.01)
  C22C 23/00 (2006.01)
  C22F 1/06 (2006.01)
  C22C 23/06 (2006.01)
(52) U.S. Cl.
  CPC ............ *C01B 3/0078* (2013.01); *C22C 1/002* (2013.01); *C22C 23/00* (2013.01); *C22C 23/06* (2013.01); *C22C 45/00* (2013.01); *C22C 45/005* (2013.01); *C22F 1/06* (2013.01); *B22F 2301/058* (2013.01); *B22F 2301/45* (2013.01); *C21D 2201/03* (2013.01); *Y02E 60/327* (2013.01)

(56) References Cited

U.S. PATENT DOCUMENTS

| | | | | |
|---|---|---|---|---|
| 5,916,381 | A * | 6/1999 | Sapru | B22F 9/005 148/403 |
| 6,103,024 | A * | 8/2000 | Sapru | B22F 9/005 148/403 |
| 7,026,058 | B2 * | 4/2006 | Towata | B32B 15/018 428/615 |
| 2004/0110023 | A1 * | 6/2004 | Towata | B32B 15/018 428/615 |
| 2005/0126663 | A1 * | 6/2005 | Fetcenko | C22C 1/0408 148/420 |

OTHER PUBLICATIONS

Lin, H.J. et al., "Room temperature gaseous hydrogen storage properties of Mg-based metallic glasses with ultrahigh Mg contents," Journal of Non-Crystalline Solids, vol. 358, (2012), pp. 1387-1390.

Jun. 23, 2014 Search Report issued in International Patent Application No. PCT/CN2013/090060.

* cited by examiner

… (2) the amorphous alloy is pulverized, so as to obtain an amorphous powder;

(3) the amorphous alloy is activated, so as to obtain a $MgH_2$—$Mg_2NiH_4$—$CeH_{2.73}$ family nanocrystalline composite;

(4) the abovementioned composite is carried out a hydrogen absorption and desorption cycle, then the composite is placed under a pure Ar atmosphere for passivation;

(5) finally, the passivated composite is oxidized, so as to obtain a $MgH_2$—$Mg_2NiH_4$—$CeH_{2.73}$—$CeO2$ family nanocrystalline composite.

The amorphous alloy prepared in step (1) is a (x+2y)Mg-2zCe-yNi amorphous alloy, wherein, $x+3y+2z=100$, $20 \leq x \leq 80$, $5 \leq y \leq 20$, and $2.5 \leq z \leq 10$; the composite prepared in step (3) is a $xMgH_2$-$yMg_2NiH_4$-$2zCeH_{2.73}$ nanocrystalline composite; and the composite prepared in step (5) is a $xMgH_2$-$yMg_2NiH_4$-$zCeH_{2.73}$-$zCeO_2$ nanocrystalline composite.

The method for preparing an amorphous alloy in step (1) comprises, a cerium ingot and a nickel ingot are mixed in a molar ratio of 1:1, carried out a melting at 2000-3000° C. by using an arc melting process, so as to obtain a rare earth-nickel intermediate alloy; then a magnesium ingot and the rare earth-nickel intermediate alloy are carried out an induction melting, wherein the molar percentage of magnesium is 60-90%, and the melting temperature is 1000-1500° C.; finally the resulting alloy is carried out a rapid cooling by a single-roller melt-spinning process.

The rotating speed of the copper roller in the single-roller melt-spinning process is 30-40 m/s, and the vacuum degree in the vacuum chamber is $5 \times 10^{-5}$ Pa.

The pulverization in step (2) is carried out by a ball mill, with a milling time of 1-2 hours, a ball/powder ratio of 40:1, and a rotating speed of 250 rpm.

The activation conditions in step (3) comprise: the hydrogen absorption is carried out at 250° C. and under 10 MPa hydrogen atmosphere for 3 hours.

The water and oxygen contents of the Ar atmosphere in the passivation in step (4) are both less than 10 ppm.

The process in the hydrogen absorption and desorption cycle in step (4) comprises, the hydrogen absorption is carried out at 300° C. and under a hydrogen pressure of 3 MPa for 0.5 hour, then the hydrogen desorption is carried out under a vacuum of 0.002 MPa for 0.5 hours, and cycled for 15 times sequentially.

The oxidation of the composite in step (5) comprises the composite is placed in a sealed container, and then the container is opened in air, filled with air and placed for 5 to 15 hours.

A magnesium-based hydrogen storage material, with a formula of $xMgH_2$-$yMg_2NiH_4$-$zCeH_{2.73}$-$zCeO_2$ ($x+3y+2z=100$, $20 \leq x \leq 80$, $5 \leq y \leq 20$, and $2.5 \leq z \leq 10$). Of these, $Mg_2Ni_4$, $CeH_{2.73}$ and $CeO2$ are all nanocrystals formed in situ, rather than added by a mechanical process, and all of them are uniformly distributed in $MgH_2$.

The Mg—Ce—Ni family amorphous alloy strip obtained in step (1) has a width of 2 mm, and a thickness of 0.04 mm; the amorphous powder obtained in step (2) has a size of 200 mesh; and the $MgH_2$—$Mg_2NiH_4$—$CeH_{2.73}$ family composite obtained in step (3) has a crystal particle size of 10-15 nm.

As calculated based on the first principle, the energy required by decomposition of the H atom in $MgH_2$ through the CeH/CeO interface is much lower than the energy required by desorption from the $MgH_2$ matrix alone, mainly because the H vacancies and O vacancies are very easily formed on the symbiotic CeH/CeO interface, and these

MAGNESIUM-BASED HYDROGEN STORAGE MATERIAL AND METHOD FOR PREPARING THE SAME

TECHNICAL FIELD

The invention relates to a technical field of a hydrogen storage alloy material and a method for preparing the same, particularly to a magnesium-rare earth-based hydrogen storage alloy material and a method for preparing the same.

BACKGROUND

Hydrogen energy storage is a key scientific problem for large-scale commercial application of hydrogen energy. Due to high hydrogen storage capacity, abundant resource, inexpensiveness, environment-friendly and the like, $MgH_2$ finds a promising application. However, the high thermodynamic stability and slow hydrogen absorption and desorption kinetics property of $MgH_2$ have greatly limited its use in the practical application. In recent years, a variety of methods have been used by the researchers to overcome these disadvantages, such as mechanical alloying, doping catalyst, hydrogen combustion method, rapid cooling, and the like. Although the magnesium-based material has greatly improved in the hydrogen absorption property, the improvement of the hydrogen desorption property is not significant, the hydrogen desorption temperature is higher than 250-300° C. and the hydrogen desorption kinetics property is slow.

The hydrogen desorption temperature can be reduced by adding rare earth and transition metal in the magnesium-based material. The alloy prepared by a conventional melting process has a high crystal particle size, and the transition metal thereof is prone to agglomeration, so that the alloy has a low reversible hydrogen storage capacity, high hydrogen desorption temperature, and low hydrogen absorption and desorption cycle life. At the same time, the hydrogen absorption and desorption properties of the magnesium-based alloy can also be significantly improved by introducing oxides such as $V_2O_5$, $Nb_2O_5$, $TiO_2$, $CeO_2$, and the like, mainly due to the catalytic effect of the oxide on the magnesium-based material. The traditional oxide addition mostly adopts the mechanical addition process, which requires a complex apparatus, and consumes a large amount of energy and time, and due to addition in a mechanical way, the distribution of these additives in the magnesium-based alloy is not very uniform, with a high size, which restricts the catalytic effect of the same on the magnesium-based material.

SUMMARY OF THE INVENTION

The purpose of the invention is to provide a magnesium-based hydrogen storage material and a method for preparing the same. The magnesium-based hydrogen storage alloy made by the method overcomes the disadvantages in the traditional magnesium-based hydrogen storage alloy, such as high hydrogen desorption temperature and slow hydrogen desorption kinetics, so that it finds a promising application in the hydrogen storage field.

The purpose of the invention is achieved by the following technical solutions:

a method for preparing a magnesium-based hydrogen storage material, comprising the steps of:

(1) a Mg—Ce—Ni family amorphous alloy is prepared by a rapid cooling process;

vacancies provide a large amount of "excessive space" for the H diffusion and dissociation, therefore the symbiotic CeH/CeO structure is very beneficial to the decomposition of $MgH_2$.

As compared to the traditional method for melting the magnesium-based hydrogen storage alloy, the hydrogen storage alloy prepared according to the present invention has the following advantages:

(1) After the specific activation process of the amorphous alloy, the crystal particle of the alloy is significantly fined, with a size of 10-15 nm.

(2) The $Mg_2NiH_4$, $CeH_{2.73}$ and $CeO_2$ in the $xMgH_2$-$yMg_2NiH_4$-$zCeH_{2.73}$-$zCeO_2$ (x+3y+2z=100, 20≤x≤80, 5≤y≤20, and 2.5≤z≤10) composite prepared in the present invention are all nanocrystals formed in situ, and are uniformly distributed in $MgH_2$, without addition by other mechanical process; and $CeH_{2.73}$ and $CeO_2$ are symbiotic, and can also form a shell-core structure.

(3) The material prepared in the present invention has significantly improved in the hydrogen desorption kinetics, the hydrogen desorption temperature is greatly lower than that of the pure $MgH_2$, and the hydrogen storage capacity is 3.0-4.0 wt %.

(4) The preparation process of the present invention is simple, inexpensive, and suitable for large-scale industrial production.

DETAILED DESCRIPTION

The present invention is further described in details below in combination with the examples, but the embodiments of the present invention are not limited thereto, and as for the process parameters which are not specifically noted, reference can be made to the conventional techniques.

Example 1

The cerium ingot (99.9%) and the nickel ingot (99.99%) were mixed in a molar ratio of 1:1, and carried out a melting at 2500° C. by an arc-melting process, and the melting was repeated for 8 times. The cerium-nickel intermediate alloy and the magnesium ingot (99.99%) were mixed, with a magnesium content of a molar ratio of 80%, and prepared by using an induction melting process, with a melting temperature of 1300° C.; the prepared $Mg_{80}Ce_{10}Ni_{10}$ alloy was carried out a rapid cooling, with a rotating speed of the copper roller of 30 m/s, and an vacuum degree in the vacuum chamber of $5\times10^{-5}$ Pa, so as to obtain an amorphous strip, with a width of 2 mm, and a thickness of 0.04 mm. The amorphous strip was pulverized by using a ball mill, with a milling time of 1.5 h, a ball/powder ratio of 40:1, and a rotating speed of 250 rpm, then passed through a 200 mesh sieve so as to obtain an amorphous powder.

Figure 1:
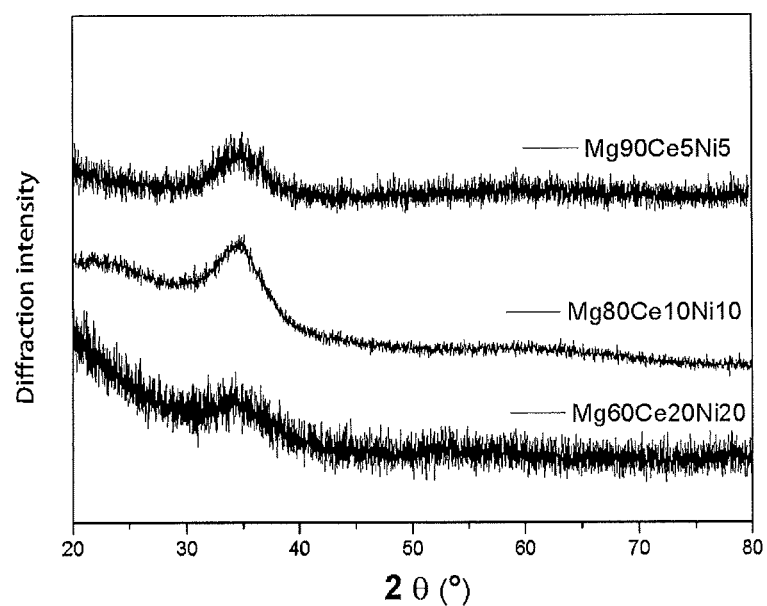
FIG. 1 shows a XRD graph of a Mg—Ce—Ni amorphous alloy prepared by rapid cooling.
Figure 2:
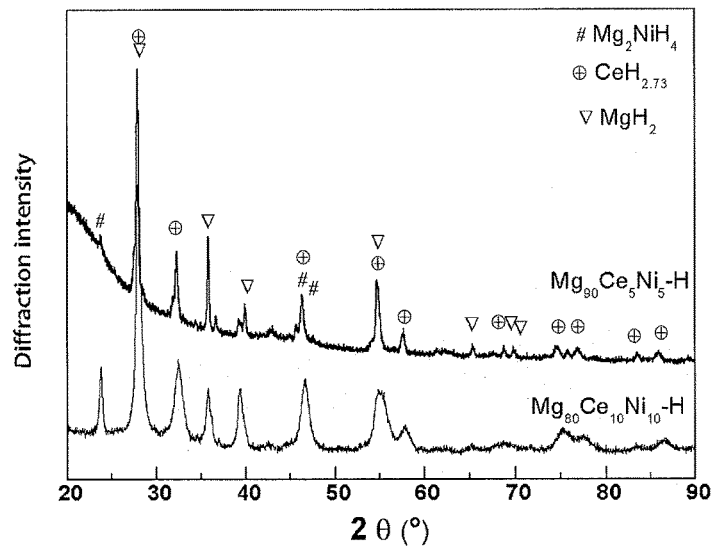
FIG. 2 shows a XRD graph of the product obtained after the Mg—Ce—Ni amorphous alloy is carried out the first hydrogen absorption under different atmospheres, it can be seen that after the hydrogen absorption, the Mg—Ce—Ni amorphous alloys are all converted into $MgH_2$—$Mg_2NiH_4$—$CeH_{2.73}$ family nanocomposite.
Figure 3:
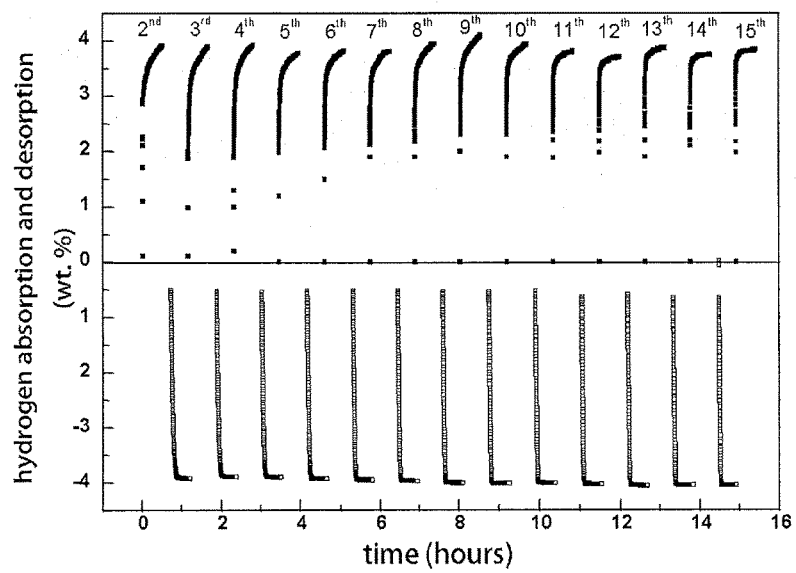
FIG. 3 shows kinetics curves of the hydrogen absorption and desorption cycle of the Mg—Ce—Ni amorphous alloy.
Figure 4:
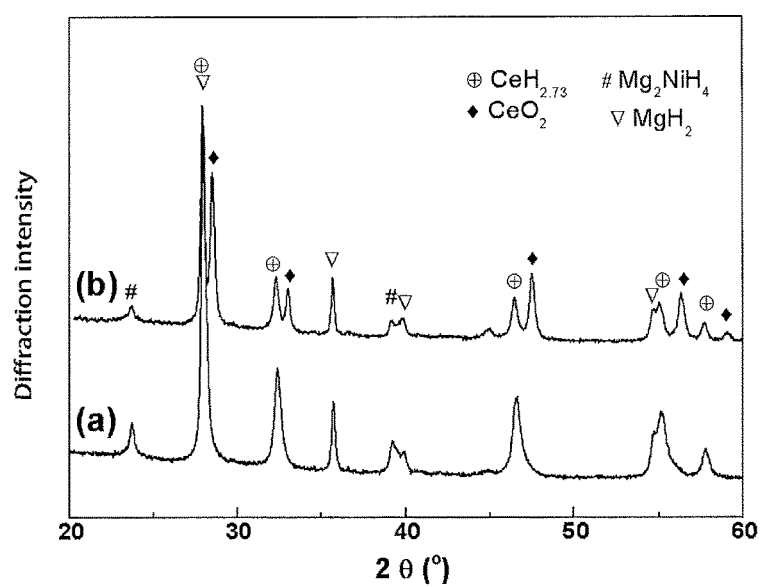
FIG. 4 shows a XRD graph of the material (a) before and (b) after the oxidation.
Figure 5:
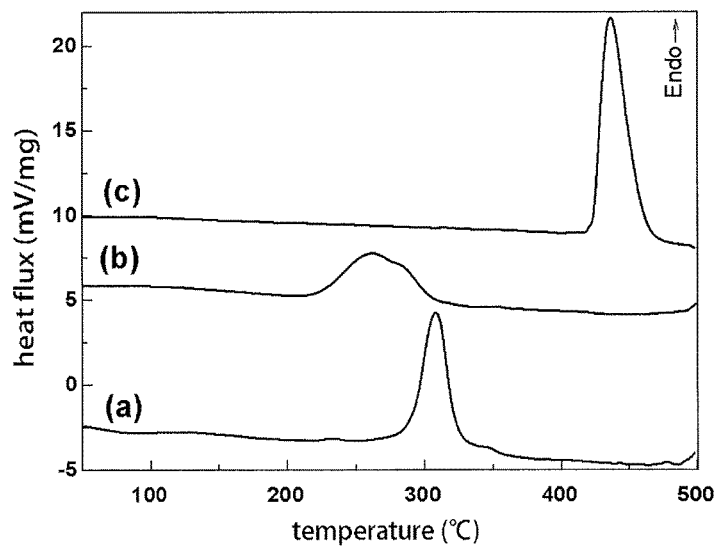
FIG. 5 shows a DSC curve of the material (a) before and (b) after the oxidation, with the commercial available pure $MgH_2$ (c) as a control.
Figure 6:
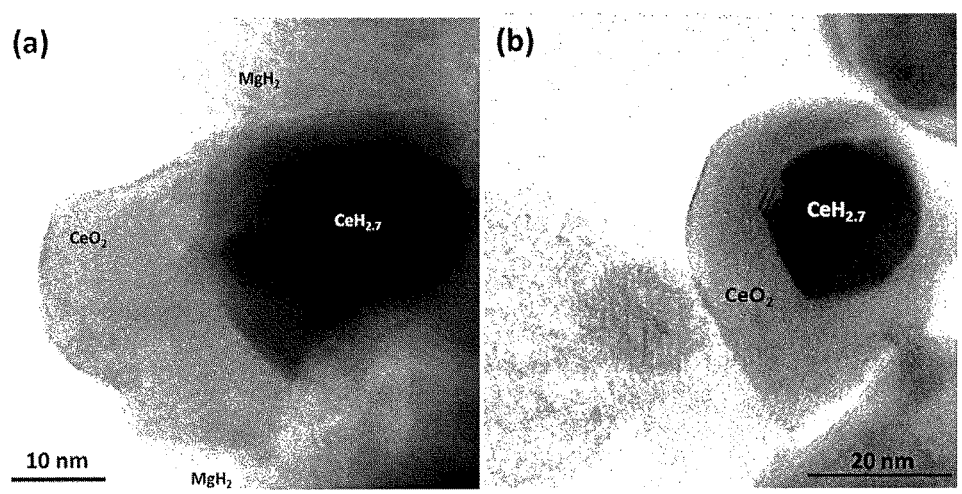
FIG. 6 shows a TEM graph of $CeO_2/CeH_{2.73}$ grown in situ, it can be seen that (a) they are grown together symbiotically, (b) sometimes can also form a shell-core structure.
Figure 7:
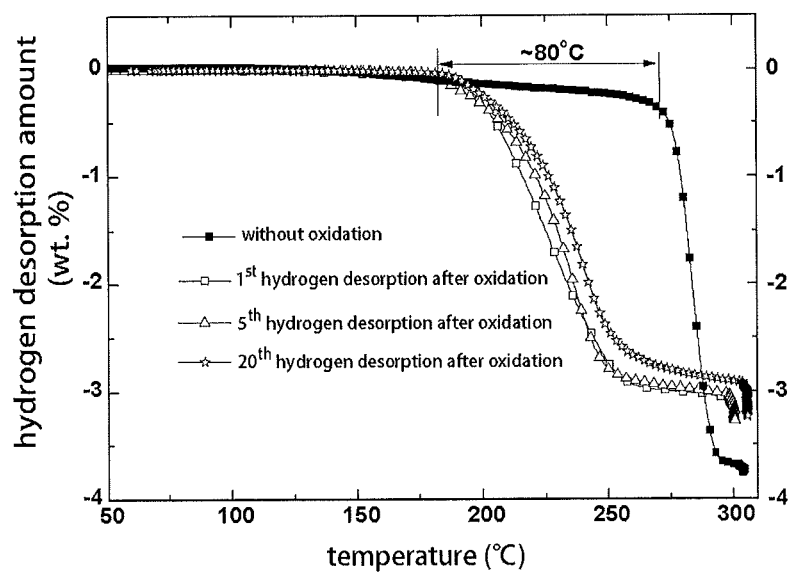
FIG. 7 shows a hydrogen desorption kinetics curve graph of the $xMgH_2$-$yMg_2NiH_4$-$zCeH_{2.73}$-$zCeO_2$ (x+3y+2z=100, 20≤x≤80, 5≤y≤20, 2.5≤z≤10) composite before and after the oxidation, and after 5 and 20 cycles.

The amorphous powder was activated, with an activation atmosphere of 10 MPa+250° C., and after it was activated for 3 hours, the hydrogen absorptions of the alloys were all approached to saturation. After the activation, a $60MgH_2$-$10Mg_2NiH_4$-$10CeH_{2.73}$ composite was obtained, and the crystal particle was very small, with a crystal particle size of 10-15 nm as calculated. Then the activated samples were carried out a hydrogen absorption and desorption cycle, wherein the hydrogen absorption was carried out at 300° C. and under a hydrogen pressure of 3 MPa for 0.5 hour, then the hydrogen desorption was carried out under a vacuum of 0.002 MPa for 0.5 hour, and they were cycled sequentially for 15 times, then placed in a glove box under a pure Ar atmosphere, and placed for one week to passivate their surfaces; finally the cycled samples were placed in a sealed tube, then the tube was opened in air, filled with air, and placed for 8 hours for oxidation, so as to obtain a $60MgH_2$-$10Mg_2NiH_4$-$5CeH_{2.73}$-$5CeO_2$ composite as $CeH_{2.73}$ was oxidized into $CeO_2$. FIG. 5 was a XRD graph of the oxidized sample. After the oxidation (in this case, the molar ratio between $CeO_2$ and $CeH_{2.73}$ was about 1:1), the hydrogen desorption initial temperature of the sample was reduced by about 210° C. as compared to that of the pure $MgH_2$. As shown in FIG. 7, $CeO_2/CeH_{2.73}$ was symbiotic, and can also form a shell-core structure. After the oxidation, the hydrogen desorption kinetics were significantly improved and as shown in FIG. 8, after 20 hydrogen absorption and desorption cycles, the hydrogen desorption performance can also be appropriately maintained.

Example 2

The cerium ingot (99.9%) and the nickel ingot (99.99%) were mixed in a molar ratio of 1:1, and carried out a melting at 2500° C. by using an arc-melting process, and the melting was repeated for 8 times. The cerium-nickel intermediate alloy and the magnesium ingot (99.99%) were mixed, with a magnesium content of a molar ratio of 60%, and prepared by using an induction melting process, with a melting temperature of 1300° C.; the prepared $Mg_{60}Ce_{20}Ni_{20}$ alloy was carried out a rapid cooling, with a rotating speed of the copper roller of 30 m/s, and a vacuum degree in the vacuum chamber of $5\times10^{-5}$ Pa, so as to obtain an amorphous strip, with a width of 2 mm, and a thickness of 0.04 mm. The amorphous strip was pulverized by using a ball mill, with a milling time of 2 h, a ball/powder ratio of 40:1, and a rotating speed of 250 rpm, then passed through a 200 mesh sieve so as to obtain an amorphous powder.

The amorphous powder was activated, with an activation atmosphere of 10 MPa+250° C., and after it was activated for 3 hours, the hydrogen absorptions of the alloys were all approached to saturation. After the activation, a $20MgH_2$-$20Mg_2NiH_4$-$20CeH_{2.73}$ composite was obtained, and the crystal particle was very small, with a crystal particle size of 10-15 nm as calculated. Then the activated samples were carried out a hydrogen absorption and desorption cycle, wherein the hydrogen absorption was carried out at 300° C. and under a hydrogen pressure of 3 MPa for 0.5 hour, then the hydrogen desorption was carried out under a vacuum of 0.002 MPa for 0.5 hour, and they were cycled sequentially for 15 times, then placed in a glove box under a pure Ar atmosphere, and placed for one week to passivate their surfaces; finally the cycled samples were placed in a sealed tube, then the tube was opened in air, filled with air, and placed for 5 hours for oxidation, so as to obtain a 20 $MgH_2$-20$Mg_2NiH_4$-10$CeH_{2.73}$-10$CeO_2$ composite as $CeH_{2.73}$ was oxidized into $CeO_2$.

Example 3

The cerium ingot (99.9%) and the nickel ingot (99.99%) were mixed in a molar ratio of 1:1, and carried out a melting at 2500° C. by using an arc-melting process, and the melting was repeated for 8 times. The cerium-nickel intermediate alloy and the magnesium ingot (99.99%) were mixed, with a magnesium content of a molar ratio of 90%, and prepared by using an induction melting process, with a melting temperature of 1300° C.; the prepared $Mg_{90}Ce_5Ni_5$ alloy was carried out a rapid cooling, with a rotating speed of the copper roller of 30 m/s, and a vacuum degree in the vacuum chamber of $5\times10^{-5}$ Pa, so as to obtain an amorphous strip, with a width of 2 mm, and a thickness of 0.04 mm. The amorphous strip was pulverized by using a ball mill, with a milling time of 2 h, a ball/powder ratio of 40:1, and a rotating speed of 250 rpm, then passed through a 200 mesh sieve so as to obtain an amorphous powder.

The amorphous powder was activated, with an activation atmosphere of 10 MPa+250° C., and after it was activated for 3 hours, the hydrogen absorptions of the alloys were all approached to saturation. After the activation, a 80$MgH_2$-5$Mg_2NiH_4$-5$CeH_{2.73}$ composite was obtained, and the crystal particle was very small, with a crystal particle size of 10-15 nm as calculated. Then the activated samples were carried out a hydrogen absorption and desorption cycle, wherein the hydrogen absorption was carried out at 300° C. and under a hydrogen pressure of 3 MPa for 0.5 hour, then the hydrogen desorption was carried out under a vacuum of 0.002 MPa for 0.5 hour, and they were cycled sequentially for 15 times, then placed in a glove box under a pure Ar atmosphere, and placed for one week to passivate their surfaces; finally the cycled samples were placed in a sealed tube, then the tube was opened in air, filled with air, and placed for 5 hours for oxidation, so as to obtain a 80 $MgH_2$-5$Mg_2NiH_4$-2.5$CeH_{2.73}$-2.5$CeO_2$ composite as $CeH_{2.73}$ was oxidized into $CeO_2$.

The abovementioned particular embodiments are only the preferred examples of the present invention, and the claims of the present invention are not limited thereto, and any other changes made without departing from the technical solutions of the present invention and other equivalent replacements, are all encompassed in the scope of the present invention.

The invention claimed is:

1. A method for preparing a magnesium-based hydrogen storage material, comprising the steps of:
   (1) a Mg—Ce—Ni family amorphous alloy is prepared by a rapid cooling process;
   (2) the amorphous alloy is pulverized, so as to obtain an amorphous powder;
   (3) the amorphous alloy is activated, so as to obtain a $MgH_2$—$Mg_2NiH_4$—$CeH_{2.73}$ family nanocrystalline composite;
   (4) the abovementioned composite is carried out a hydrogen absorption and desorption cycle, then the composite is placed in a pure Ar atmosphere for passivation,
   (5) finally, the passivated composite is oxidized, so as to obtain a $MgH_2$—$Mg_2NiH_4$—$CeH_{2.73}$—$CeO_2$ family nanocrystalline composite.

2. A method according to claim 1, wherein the amorphous alloy prepared in step (1) is a (x+2y) Mg-2zCe-yNi amorphous alloy, wherein x+3y+2z=100, 20≤x≤80, 5≤y≤20, and 2.5≤z≤10; the composite prepared in step (3) is a x$MgH_2$-y$Mg_2NiH_4$-2z$CeH_{2.73}$ nanocrystalline composite; and the composite prepared in step (5) is a x$MgH_2$-y$Mg_2NiH_4$-z$CeH_{2.73}$-z$CeO_2$ nanocrystalline composite.

3. A method according to claim 2, wherein the method for preparing a amorphous alloy in step (1) comprises a cerium ingot and a nickel ingot are mixed in a molar ratio of 1:1, carried out a melting at 2000-3000° C. by using an arc melting process, so as to obtain a rare earth-nickel intermediate alloy; then a magnesium ingot and the rare earth-nickel intermediate alloy is carried out an induction melting, wherein the molar percentage of magnesium is 60-90%, and the melting temperature is 1000-1500° C.; finally the resulting alloy is carried out a rapid cooling by using a single-roll melt-spinning process.

4. A method according to claim 3, wherein the rotating speed of the copper roller in the single-roll melt-spinning process is 30-40 m/s, and the vacuum degree in the vacuum chamber is $5\times10^{-5}$ Pa.

5. A method according to claim 1, wherein the pulverization in step (2) is carried out by using a ball mill, with a milling time of 1-2 hours, a ball/powder ratio of 40:1, and a rotating speed of 250 rpm.

6. A method according to claim 1, wherein the activation conditions in step (3) comprise hydrogen absorption is carried out at 250° C. and under 10 MPa hydrogen atmosphere for 3 hours.

7. A method according to claim 1, wherein the water and oxygen contents in the Ar atmosphere in the passivation in step (4) is both less than 10 ppm.

8. A method according to claim 1, wherein the process of the hydrogen absorption and desorption circle in step (4) comprises the hydrogen absorption is carried out at 300° C. and under a hydrogen pressure of 3 MPa for 0.5 hour, then the hydrogen desorption is carried out under a vacuum of 0.002 MPa for 0.5 hour, and cycled for 15 times sequentially.

9. A method according to claim 1, wherein the oxidation of the composite in step (5) comprises the composite is placed in a sealed container, then the container is opened in air, filled with air, and placed for 5-15 hours.

10. A magnesium-based hydrogen storage material prepared by any method of claim 1, wherein the material has a formula of x$MgH_2$-y$Mg_2NiH_4$-z$CeH_{2.73}$-z$CeO_2$, wherein x+3y+2z=100, 20≤x≤80, 5≤y≤20, and 2.5≤z≤10; and the material has a crystal particle size of 10-15 nm.

* * * * *